United States Patent [19]
Haney

[11] 4,128,080
[45] Dec. 5, 1978

[54] ANIMAL FEEDER

[76] Inventor: C. Rex Haney, 14160 Sayre St., Sylmar, Calif. 91342

[21] Appl. No.: 785,056

[22] Filed: Apr. 6, 1977

[51] Int. Cl.² ............................................. A01K 5/00
[52] U.S. Cl. ...................................... 119/51.5; 119/61
[58] Field of Search .................................. 119/51.5, 61

[56] References Cited

U.S. PATENT DOCUMENTS

| 1,552,076 | 9/1925 | Mosier | 119/61 |
| 2,543,465 | 2/1951 | Morey | 119/51.5 |

FOREIGN PATENT DOCUMENTS 1133174  7/1962  Fed. Rep. of Germany ............ 119/61

*Primary Examiner*—Russell R. Kinsey
*Assistant Examiner*—Daniel J. Leach

[57] ABSTRACT

This invention is an improved insect-proof animal feeder of the type which combines the food dish with the water dish, the food dish being supported on a pillar(s) which rises out of the water in the water dish. This improved feeder uses rectangular dishes with the food dish offset from center so that the support pillar may be shortened considerably still leaving room for the animal to drink from the lower water dish.

2 Claims, 3 Drawing Figures

ANIMAL FEEDER

BACKGROUND OF THE INVENTION

Food dishes for pets and livestock often become infested with ants and other crawling insects. A variety of inventions have provided a method of preventing this by supporting the food dish in a mechanism that requires the crawling insect to pass through a container filled with water before it can reach the animal food. Sinclair, in U.S. Pat. No. 2,584,301 (1949), disclosed food dishes supported in, and surrounded by, a small trough filled with water. Morey, in U.S. Pat. No. 2,543,465 (1945) disclosed an arrangement wherein the food dish simply sat in the center of a water dish and was attached by a screw arrangement. Prestidge, in U.S. Pat. No. 2,677,350 (1951) disclosed a single molded tray incorporating food dish, water dish, and protective water trough insect barrier into a single device. Sager, in German Pat. No. 1,133,174 (1962), disclosed a food dish elevated on a post rising out of the water dish.

Of the above inventions, only Sager and Morey use the animal watering dish to form the insect barrier to the food dish. Each of these has the food dish centered over the water dish so that the water dish must be much larger than the food dish or the food dish must be supported some modest height above the water dish to allow the animal to reach the water.

SUMMARY OF THE INVENTION

This invention presents an improved insect-proof animal feeder following Morey and Sager. This invention uses the animal's water dish as a moat or barrier to crawling insects. The food dish is supported on a pillar which holds the food dish above the water dish so that it does not significantly reduce the value of the water dish. The supporting pillar is in the center of the water dish but the food dish is supported to one side of the pillar so that the animal is not obstructed from drinking from one half of the water dish. Consequently, the pillar can be very short with the food dish supported just above the water dish. If the animal, while feeding, pushes down with great force on the food dish, it pushes the bottom of the food dish against the top of the water dish before a force sufficient to fracture the food dish support is exerted. The food and water dishes are rectangular to simplify packaging and to allow the dish to be placed against a wall or in a corner more conveniently.

It is an object of this invention to provide an insect-proof animal food dish supported on a post rising out of the drinking water dish so that crawling animals cannot reach the food.

It is an object of this invention to allow the animal to conveniently drink from the lower water dish by offsetting the food dish away from the center of the water dish.

It is an object of this invention to utilize a very short support post for the food dish giving greater rigidity to the food dish support.

It is an object of this invention to allow the food dish and support to bend slightly, should the animal press firmly down on the food dish while feeding, so that the food dish rests against the water dish before fracture occurs.

DESCRIPTION OF THE DRAWINGS

The invention is illustrated in the following drawing.

Figure 1:
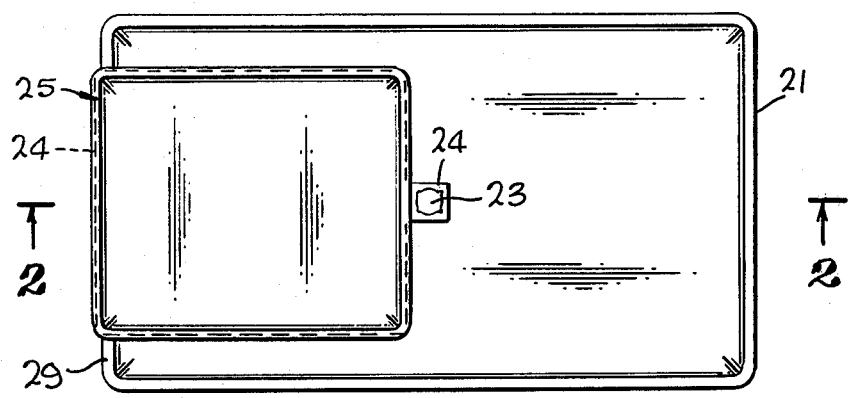
FIG. 1 is a top view of the animal feeder.

The lower dish 21 of the animal feeder is filled with water. A short support post 23 attached to the water dish rises out of the water and extends upward to support the food dish 25. The food dish is attached to, and is supported to one side of the short support post. In the model illustrated, the food dish 25 sets in a rectangular bracket 24 which is attached to the support post so that the food dish can be lifted out of the bracket 24. In the model shown the support post 23 supporting the bracket 24 fits over and attaches to a short stud 22 which is an integral part of the water dish 21. The stud and bottom of the support post are fluted or of non circular cross sections to prevent the support post and food dish from rotating about the stud 22. The clearance space 28 between the food dish and water dish is less than an inch so that excessive force on the food dish will cause its bottom 27 to rest against the top 29 of the water dish. Rigidity and strength of the stud 22, post 23 and bracket 24 are chosen so that the food dish and water dish will not touch under ordinary load of food in the food dish but will touch before fracture of any of the parts occurs under load.

DESCRIPTION OF THE PREFERRED EMBODIMENT

Figure 2:
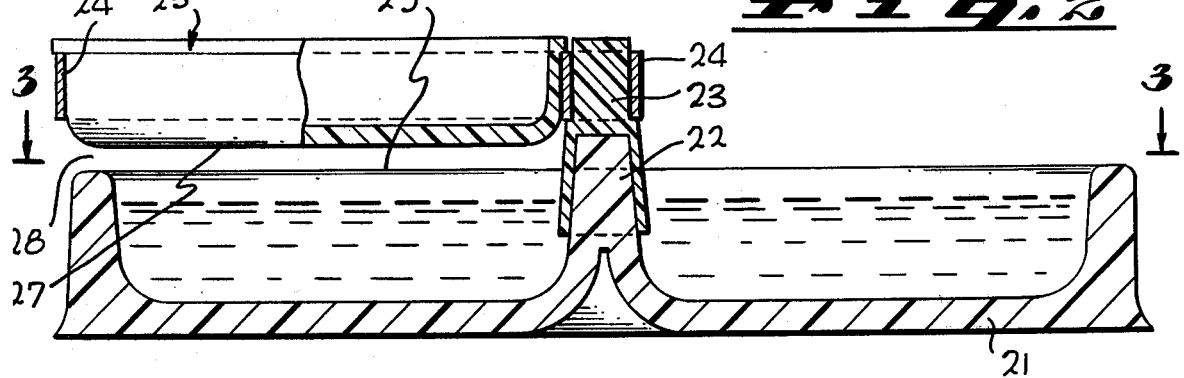
FIG. 2 is a plan view of a cross section of the animal feeder taken along line 2—2 of FIG. 1.
Figure 3:
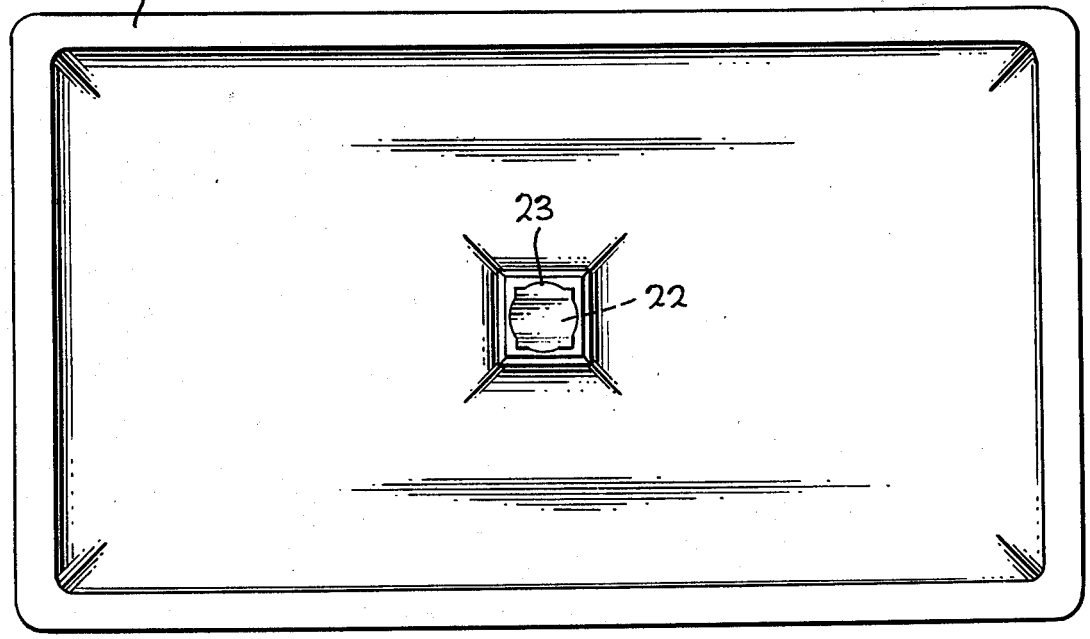
FIG. 3 is a plan view of the water dish at the base of the animal feeder taken along the line 3—3 of FIG. 2.

The preferred embodiment is that illustrated in FIGS. 1 through 3, wherein the food dish and water dish are of molded plastic, the support post is plastic and the bracket supporting the food dish on the support post is of metal. However, any of the parts could be of metal. The bracket could be built into the food dish as an integral molded plastic unit, but the preferred embodiment is that set forth above with a separate bracket.

What is claimed is:

1. An improved animal feeder comprising a rectangular water dish, said water dish having a base with a non-circular post extending upwardly from said base near the center of said water dish, a rectangular bracket which attaches to, and is supported on, said post, said rectangular bracket extending to one side only of said post, and a rectangular food dish which rests on said bracket to one side of said post such that the bottom of said food dish is supported a short distance above the top rim of said water dish.

2. An improved animal feeder comprising the improved animal feeder of claim 1 wherein the distance between the bottom of said food dish and the top rim of said water dish is less than 1 inch and such that said post and bracket bend allowing said food dish to rest on the top rim of said water dish when sufficient downward force is applied to said food dish.

* * * * *